US008068620B2

(12) United States Patent
Ikeda

(10) Patent No.: US 8,068,620 B2
(45) Date of Patent: Nov. 29, 2011

(54) AUDIO PROCESSING APPARATUS

(75) Inventor: Shingo Ikeda, Tama (JP)

(73) Assignee: Canon Kabushiki Kaisha, Tokyo (JP)

( * ) Notice: Subject to any disclaimer, the term of this patent is extended or adjusted under 35 U.S.C. 154(b) by 945 days.

(21) Appl. No.: 12/039,410

(22) Filed: Feb. 28, 2008

(65) Prior Publication Data

US 2008/0212794 A1 Sep. 4, 2008

(30) Foreign Application Priority Data

Mar. 1, 2007 (JP) ................................ 2007-051818
Feb. 6, 2008 (JP) ................................ 2008-025832

(51) Int. Cl.
*H04B 15/00* (2006.01)
(52) U.S. Cl. ........................................ 381/94.1; 381/92
(58) Field of Classification Search ................ 381/94.1, 381/92–94
See application file for complete search history.

(56) References Cited

U.S. PATENT DOCUMENTS

| | | | | |
|---|---|---|---|---|
| 5,325,437 | A * | 6/1994 | Doi et al. | 381/71.9 |
| 5,550,925 | A | 8/1996 | Hori et al. | |
| 6,584,201 | B1 * | 6/2003 | Konstantinou et al. | 381/57 |
| 7,499,686 | B2 * | 3/2009 | Sinclair et al. | 455/223 |
| 7,587,056 | B2 * | 9/2009 | Zhang | 381/94.1 |
| 7,889,874 | B1 * | 2/2011 | Ayad | 381/94.2 |
| 7,895,036 | B2 * | 2/2011 | Hetherington et al. | 704/233 |
| 2009/0164212 | A1 * | 6/2009 | Chan et al. | 704/226 |

FOREIGN PATENT DOCUMENTS

JP 4-270599 A 9/1992

* cited by examiner

*Primary Examiner* — Nathan Ha

(57) ABSTRACT

A signal processing apparatus includes sound collecting elements, a noise detector for detecting a level of noise in a low-frequency band of audio signals output from the sound collecting elements, a noise reduction unit for reducing the noise in the audio signals in accordance with a signal output from the noise detector, a converter for converting the audio signals output from the noise reduction unit into pieces of audio data corresponding to channels including a low-frequency channel and other channels, a low-frequency channel controller for controlling a level of the audio data corresponding to the low-frequency channel in accordance with the level of the noise detected using the noise detector, and a level controller for controlling the level of the audio data of the low-frequency channel output from the low-frequency channel controller and levels of the pieces of audio data corresponding to the other channels output from the converter.

12 Claims, 10 Drawing Sheets

AUDIO PROCESSING APPARATUS

BACKGROUND OF THE INVENTION

1. Field of the Invention

The present invention relates to audio processing apparatuses, and more particularly relates to an audio processing apparatus capable of reducing noise in an input audio signal.

2. Description of the Related Art

In general, video cameras which capture images and record the images along with audio signals input from microphones are known.

Furthermore, as a technique of reducing noise which is generated in an audio signal due to, for example, wind, and which is sensed by microphones, a method for reducing low-pitched sounds in opposite phases of two-channel audio data is known (refer to Japanese Patent Laid-Open No. 4-270599 corresponding to U.S. Pat. No. 5,550,925). Moreover, a method for changing a range of frequency in which the low-pitched sounds in opposite phase are reduced in accordance with a wind noise level is known.

In most DVD (digital versatile disc) video systems, 5.1 channel surround audio is recorded as audio data. The 5.1 channel surround audio has a plurality of audio channels, including an audio channel used mainly for a low frequency.

In recent years, video cameras capable of recording such 5.1 channel surround audio signals have been proposed. Specifically, audio signals obtained using a plurality of omnidirectional microphones are subjected to matrix calculation to be converted into 5.1 channel audio signals and recorded.

In a case where the method disclosed in Japanese Patent Laid-Open No. 4-270599 is employed, when audio signals corresponding to a plurality of channels are subjected to wind noise reduction processing and are converted into 5.1 channel surround audio, low-frequency components of the wind noise which failed to be removed may be emphasized.

Since the wind noise mainly includes low frequencies, when low-frequency components of the wind noise which failed to be removed are included in the low-frequency channel included in the converted 5.1 channel surround audio, harsh sound may be recorded.

SUMMARY OF THE INVENTION

The present invention provides an apparatus capable of reducing noise included in low-frequency components of an input audio signal.

According to an embodiment of the present invention, a signal processing apparatus includes a plurality of sound collecting elements, a noise detector configured to detect a level of noise included in a low-frequency band of a plurality of audio signals output from the plurality of sound collecting elements, a noise reduction unit configured to reduce the noise included in the plurality of audio signals output from the plurality of sound collecting elements in accordance with a signal output from the noise detector, a converter configured to convert the plurality of audio signals output from the noise reduction unit into pieces of audio data corresponding to a plurality of channels including a low-frequency channel and other channels, a low-frequency channel controller configured to control a level of the audio data corresponding to the low-frequency channel in accordance with the level of the noise detected using the noise detector, and a level controller configured to control the level of the audio data of the low-frequency channel output from the low-frequency channel controller and levels of the pieces of audio data corresponding to the other channels output from the converter.

According to another embodiment of the present invention, a signal processing apparatus includes a plurality of sound collecting elements, a noise detector configured to detect a level of noise included in a low-frequency band of a plurality of audio signals output from the plurality of sound collecting elements, a noise reduction unit configured to reduce the noise included in the plurality of audio signals output from the plurality of sound collecting elements in accordance with a signal output from the noise detector, a converter configured to convert the plurality of audio signals output from the noise reduction unit into pieces of audio data corresponding to a plurality of channels having different directional characteristics and into audio data corresponding to a low-frequency channel, and a level controller configured to control the level of the audio data of the low-frequency channel and levels of the pieces of audio data corresponding to the other channels output from the converter. The converter includes a calculation unit which generates the pieces of audio data corresponding to the plurality of channels having different directional characteristics by calculating the plurality of audio signals output from the noise reduction unit, a synthesis unit which extracts and synthesizes low-frequency components included in the plurality of audio signals output from the noise reduction unit, and a low-frequency channel controller which controls a level of a signal output from the synthesis unit in accordance with the level of the noise detected using the noise detector and which outputs the signal as the audio data corresponding to the low-frequency channel.

Further features of the present invention will become apparent from the following description of exemplary embodiments with reference to the attached drawings.

DESCRIPTION OF THE EMBODIMENTS

Exemplary embodiments of the present invention will be described hereinafter.

Figure 2:
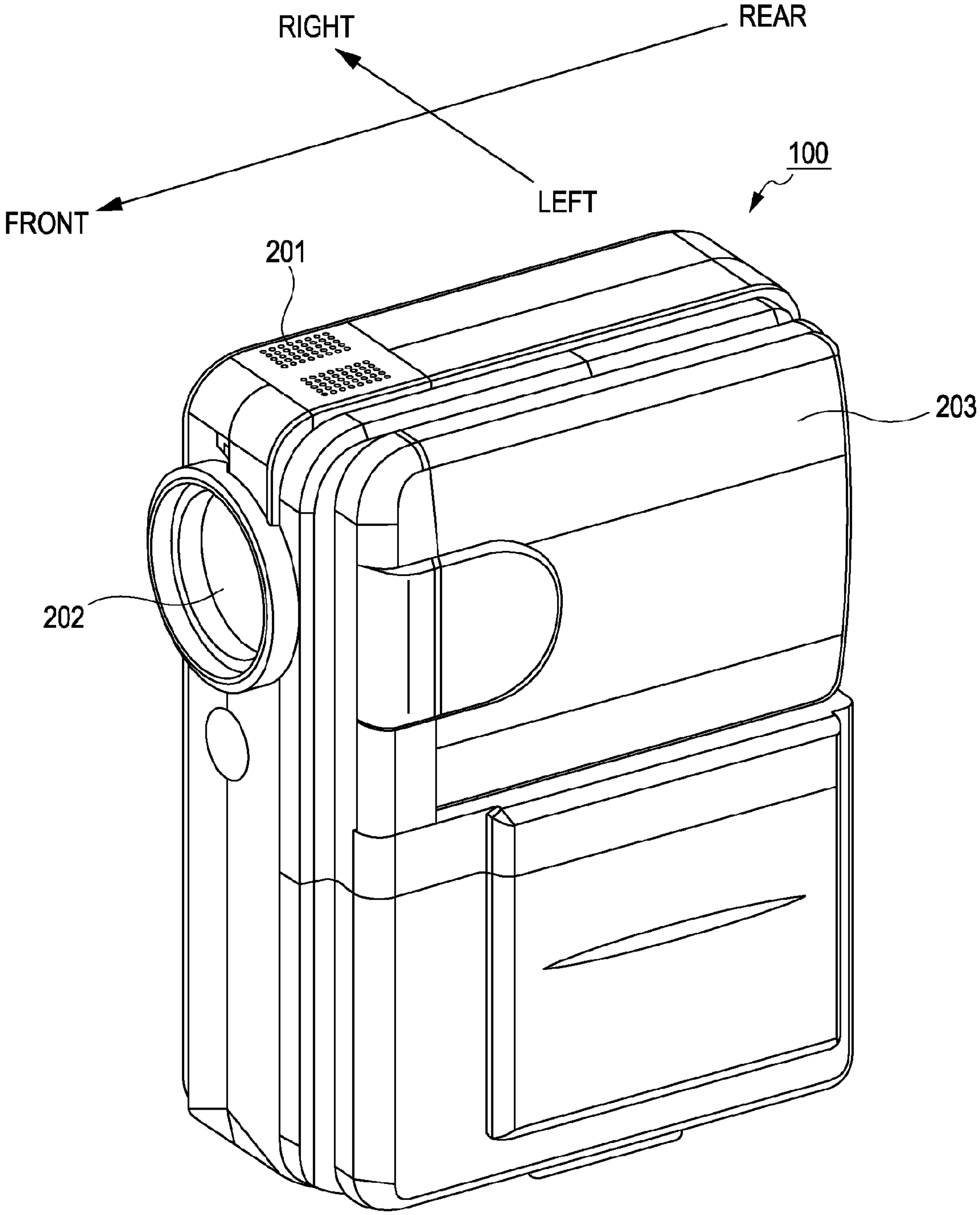
FIG. 2 is a perspective view illustrating the video camera according to the embodiment of the present invention.

FIG. 2 is a perspective view illustrating a video camera 100 according to an embodiment of the present invention.

In FIG. 2, the video camera 100 includes an imaging lens 202 which captures an optical image of a subject, a microphone unit 201 including four sound collecting elements (microphones) which collect ambient sound, and a display panel 203 which displays the captured image or an image to be reproduced and various pieces of information. The display panel 203 is openably attached to a body of the video camera 100.

As shown in FIG. 2, the imaging lens 202 is disposed on a front side relative to the center of the video camera 100.

Figure 1:
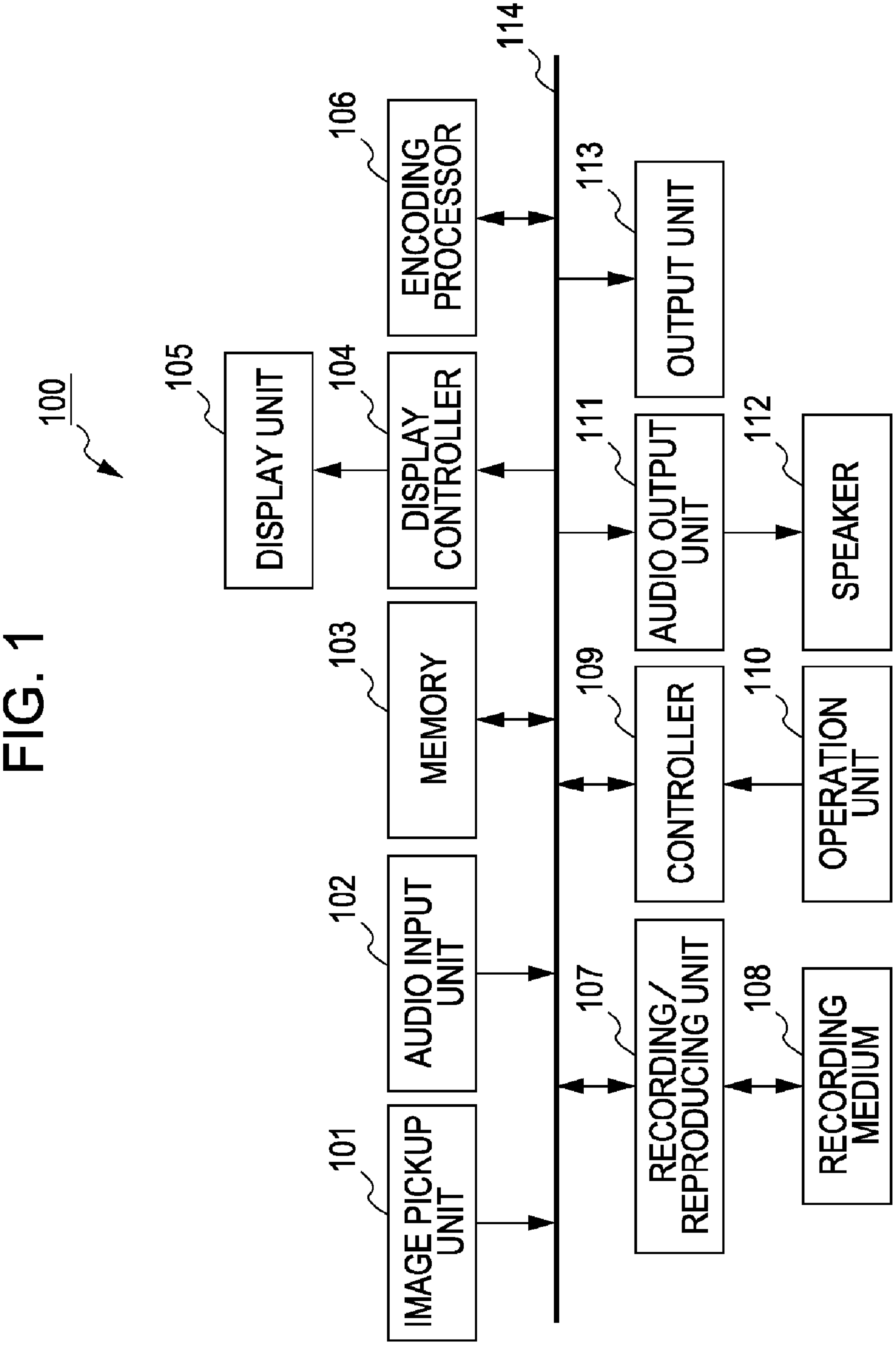
FIG. 1 is a block diagram illustrating a configuration of a video camera according to an embodiment of the present invention.

FIG. 1 is a block diagram illustrating functions of the video camera 100 shown in FIG. 2.

When the video camera 100 is powered on by turning on a power supply switch included in an operation unit 110, a controller 109 controls an image pickup unit 101 to start capturing an image of a subject. The image pickup unit 101 including the imaging lens 202 shown in FIG. 2 captures the image of the subject and outputs a moving-image signal. The moving-image signal output from the image pickup unit 101 is supplied to a display controller 104. The controller 109 controls the display controller 104 so that the display controller 104 controls a display unit 105 to display the image corresponding to the moving-image signal obtained using the image pickup unit 101. The display unit 105 includes, for example, the display panel 203 shown in FIG. 2 and a liquid crystal panel.

In this state, that is, in a recording pause state, when a user operates a recording trigger switch included in the operation unit 110, the controller 109 controls the various units and starts a recording processing.

The image pickup unit 101 controls a memory 103 to store moving-image data corresponding to the moving-image signal from a portion of the moving-image data corresponding to a frame of the moving-image data instructed to be recorded. An audio input unit 102 processes an audio signal obtained using the microphone unit 201 to generate 5.1 channel audio data to be stored in the memory 103.

An encoding processor 106 reads the moving-image data and the audio data stored in the memory 103, encodes the moving-image data and the audio data in accordance with a known MPEG (Moving Picture Experts Group) method, and outputs the moving-image data and the audio data to a recording/reproducing unit 107. The encoded moving-image data and the encoded audio data are synthesized with each other using the recording/reproducing unit 107 in accordance with a recording format before being recorded in a recording medium 108. In this state, when the user issues an instruction of stopping the recording processing, the recording/reproducing unit 107 stops recording the moving-image data and the audio data to the recording medium 108. In the present embodiment, the moving data and the audio data recorded in a period from the start of the recording processing to the stop of the recording processing in response to the user's instruction are collectively managed as a scene.

Next, processing during reproducing will be described.

When an instruction of reproduction is issued by selecting a scene from among a plurality of scenes recorded in the recording medium 108 using the operation unit 110, the controller 109 controls the recording/reproducing unit 107 to reproduce moving-image data and audio data corresponding to the selected scene.

The recording/reproducing unit 107 supplies the moving-image data and the audio data to be reproduced to the encoding processor 106. The encoding processor 106 encodes the moving-image data and the audio data to be reproduced and the encoded moving-image data and the encoded audio data are stored in the memory 103.

Then, the display controller 104 reads the moving-image data from the memory 103 and the read moving-image data is displayed in the display unit 105.

On the other hand, an audio output unit 111 reads the audio data from the memory 103 and the read audio data is output from speakers 112. Note that in the present embodiment, the speakers 112 correspond to stereo audio speakers of two left and right channels. Therefore, as described below, the speakers 112 cannot output 5.1 channel audio data. Accordingly, the audio output unit 111 converts the 5.1 channel audio data instructed to be reproduced into 2 channel audio data, and the 2 channel audio data is output from the speakers 112.

An output unit 113 reads the moving-image data and the audio data to be reproduced from the memory 103 and outputs the moving-image data and the audio data to the outside of the video camera 100.

Figure 3A:
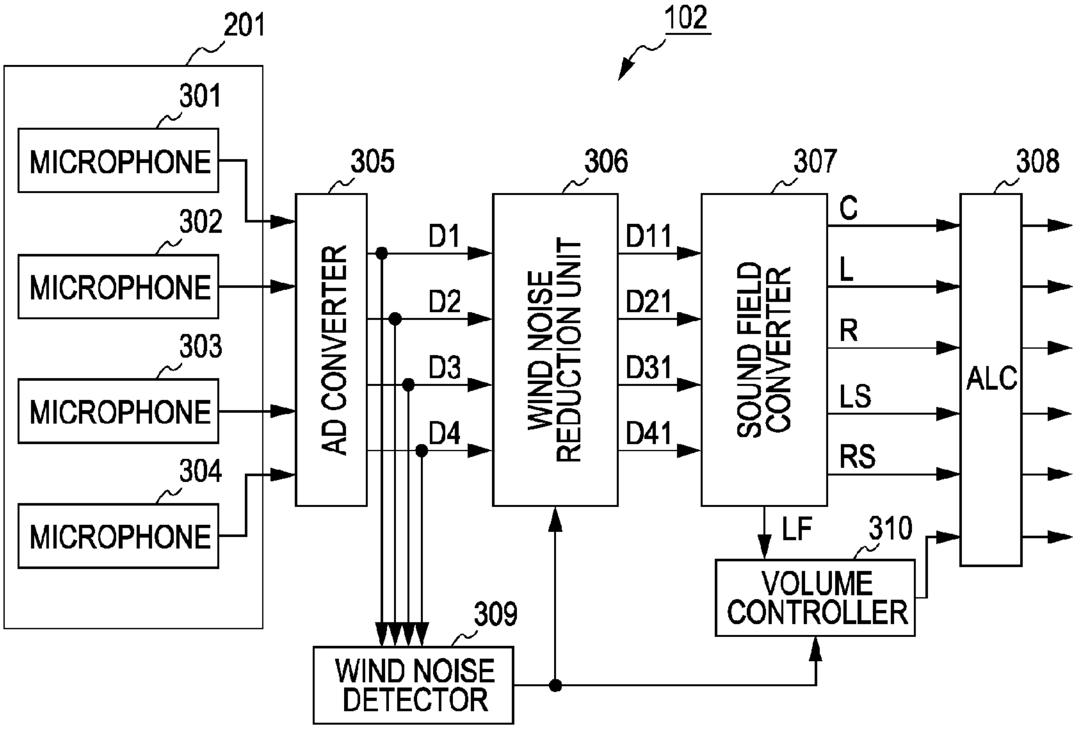
FIGS. 3A and 3B are diagrams illustrating a configuration of an audio input unit.

Processing performed using the audio input unit 102 will now be described. FIG. 3A is a diagram illustrating a configuration of the audio input unit 102.

Figure 3B:
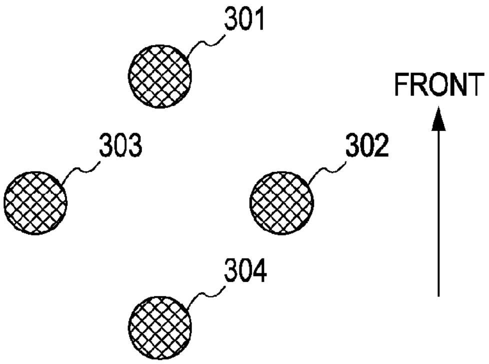

In FIG. 3A, sound collecting elements (microphones) 301 to 304 collect sounds surrounding the elements and outputs the sounds as analog audio signals to an AD (analog-to-digital) converter 305. The sound collecting elements 301 to 304 are arranged near each other. FIG. 3B shows an arrangement of the sound collecting elements 301 to 304.

The sound collecting elements 301 to 304 are omnidirectional microphones and are arranged as shown in FIG. 3B on a front side relative to the center of the video camera 100.

The AD converter 305 includes an amplifier arranged in an input stage therein. The AD converter 305 amplifies the analog audio signals supplied from the sound collecting elements 301 to 304 and converts the supplied analog audio signals into digital audio signals D1 to D4. Furthermore, the AD converter 305 outputs the digital audio signals D1 to D4 to a wind noise reduction unit 306 and a wind noise detector 309.

The wind noise detector 309 detects wind noise in each of the digital audio signals D1 to D4 output from the AD converter 305, and outputs a signal L representing a level of the wind noise in each of the digital audio signals D1 to D4. The wind noise reduction unit 306 reduces the wind noise in each of the digital audio signals D1 to D4 output from the AD converter 305 and outputs digital audio signals D11 to D41 to a sound field converter 307. Operations of the wind noise detector 309 and the wind noise reduction unit 306 are described below.

The sound field converter 307 performs known calculation processing on the four digital audio signals D1 to D41 output from the wind noise reduction unit 306 to generate 5.1 channel digital audio signals corresponding to a low-frequency channel and five audio channels which have directional characteristics different from one another.

Specifically, a 5.1 channel includes a front-right channel (R), a front-left channel (L), a front-center channel (C), a rear-right channel (RS), a rear-left channel (LS), and a low-frequency channel (LF).

More specifically, the front-center channel signal C is generated using the digital audio signal D1 corresponding to the signal output from the sound collecting element 301 and the digital audio signal D4 corresponding to the signal output from the sound collecting element 304. The front-left channel signal L is generated using the digital audio signal D1 corresponding to the signal output from the sound collecting element 301 and the digital audio signal D2 corresponding to the signal output from the sound collecting element 302. The front-right channel signal R is generated using the digital audio signal D1 corresponding to the signal output from the sound collecting element 301 and the digital audio signal D3 corresponding to the signal output from the sound collecting element 303.

The rear-left channel signal LS is generated using the digital audio signal D2 corresponding to the signal output from the sound collecting element 302 and the digital audio signal D4 corresponding to the signal output from the sound collecting element 304. The rear-right channel signal RS is generated using the digital audio signal D3 corresponding to the signal output from the sound collecting element 303 and the digital audio signal D4 corresponding to the signal output from the sound collecting element 304. Furthermore, the low-frequency channel signal LF is generated using low-frequency components output from the sound collecting elements 301 to 304.

Note that the 5.1 channel audio may conform to specification of Dolby® Surround, for example, but is not limited to this.

Pieces of audio data corresponding to these channel signals other than the low-frequency channel signal LF are supplied to an auto level controller (ALC) 308. On the other hand, audio data corresponding to the low-frequency channel signal LF is supplied to a volume controller 310.

The volume controller 310 controls a level (volume) of the low-frequency channel signal LF in accordance with the wind noise level signal L supplied from the wind noise detector 309 and supplies the low-frequency channel LF to the auto level controller 308. Operation performed using the volume controller 310 is described below.

The ALC 308 controls levels of the digital audio channel signals C, L, R, LS, and RS and the low-frequency digital audio channel signal LF to be a predetermined level.

Specifically, the ALC 308 determines an amount of a level to be controlled of a digital audio channel signal having the highest level among the digital audio channel signals C, L, R, LS, and RS supplied from the sound field converter 307 so that the highest level of the digital audio channel signal is brought into a predetermined level. Then, the ALC 308 controls the levels of the digital audio channel signals C, L, R, LS, and RS in accordance with the determined amount of a level to be controlled.

When the 5.1 channel audio is employed, balance between the channel signals is important. Specifically, the ALC 308 controls the levels of the digital audio channel signals so that balance of the channel signals is optimized. In the present embodiment, since the ALC 308 controls the levels of the digital audio channel signals by the predetermined amount, the levels are controlled while the balance of the channel signals is kept. Then, the pieces of audio data corresponding to the channel signals in which the levels thereof are controlled are stored in the memory 103.

Figure 5:
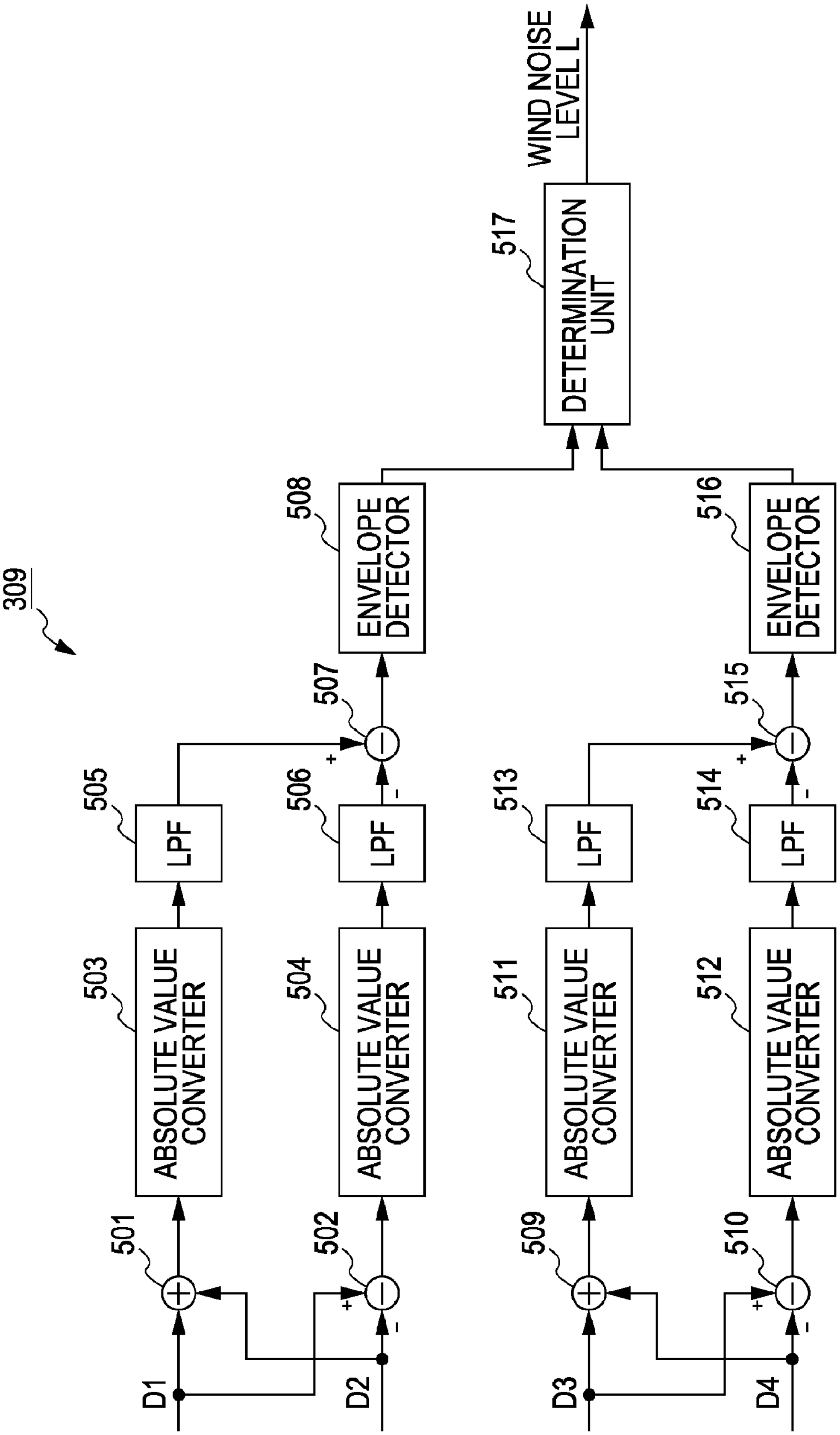
FIG. 5 is a block diagram illustrating a configuration of a wind noise detector.

Operation of the wind noise detector 309 will now be described. FIG. 5 is a block diagram illustrating a configuration of the wind noise detector 309.

The wind noise detector 309 includes two systems: a first system used to detect a wind noise level L1 using the digital audio signals D1 and D2; and a second system used to detect a wind noise level L2 using the digital audio signals D3 and D4. The wind noise detector 309 compares the wind noise level L1 with the wind noise level L2 to calculate the average wind noise level L. Note that in the present embodiment, although a pair of the digital audio signals D1 and D2 and a pair of the digital audio signals D3 and D4 are used, these pairs of the digital audio signals are merely examples and combinations of the digital audio signals do not depend on the arrangement of the sound collecting elements.

In the case of normal sound, since a low-frequency channel signal has a low directional characteristic, when the plurality of microphones are arranged near each other, signals having identical phases are generated. However, when low-frequency channel signals are generated due to wind sensed by the plurality of microphones, the generated signals are not associated with one another and therefore have different phases. The wind noise detection unit 309 detects the wind noise level L making use of this characteristic.

An adder 501 adds the digital audio signal D1 and the digital audio signal D2 and outputs an addition signal D1+D2. A subtractor 502 subtracts the digital audio signal D2 from the digital audio signal D1 and outputs a difference signal D1−D2. An absolute value converter 503 converts the output addition signal D1+D2 output from the adder 501 into an absolute value |D1+D2| thereof and supplies the absolute value |D1+D2| to an LPF (low-pass filter) 505. An absolute value converter 504 converts the difference signal D1−D2 output from the subtractor 502 into an absolute value |D1−D2| thereof and supplies the absolute value |D1−D2| to an LPF 506 having a transmission characteristic similar to that of the LPF 505. The LPFs 505 and 506 are digital filters used to reduce high-frequency components of input signals. In low-frequency regions of the input audio signals, a signal output from the LPF 505 is substantially equal to the signal |D1+D2| input to the LPF 505, and a signal output from the LPF 506 is substantially equal to the signal |D1−D2| input to the LPF 506.

A subtracter 507 subtracts the signal |D1−D2| output from the LPF 506 from the signal |D1+D2| output from the LPF 505. A signal output from the subtracter 507 substantially corresponds to |D1+D2|−|D1−D2|. An envelope detector 508 detects an envelope of the signal output from the subtracter 507 and outputs a wind noise level L1 of the detected envelope.

Among sounds collected using the sound collecting elements 301 to 304, a sound which is not generated by wind but is generated by the subject has identical phases of low-frequency components of the digital audio signals D1 to D4. In this case, the signal output from the LPF 505 corresponds to |D1+D2|≈|2×D1|≈|2×D2|, and the signal output from the LPF 506 corresponds to |D1−D2|≈0. As a result, the signal output from the subtracter 507 corresponds to |2×D1| or |2×D2|.

On the other hand, in a case where the sound is generated by wind, the low-frequency components of the digital audio signals D1 to D4 are not associated with one another.

Therefore, in this case, the signal |D1−D2| output from the LPF 506 is larger than the signal |D1+D2| output from the LPF 505.

Specifically, when components of the wind noise included in the digital audio signals D1 and D2 are 180 degrees different from each other, the signal output from the LPF 505 corresponds to |D1+D2|≈0 and the signal output from the LPF 506 corresponds to |D1−D2|≈|2×D1|≈|2×D2|.

Accordingly, in a case where the sound collecting elements 301 to 304 sense wind noise, the subtractor 507 outputs a negative signal. In particular, in a case where the components of the wind noise included in the digital audio signals D1 and D2 are 180 degrees different from each other, the signal output from the subtractor 507 corresponds to −|2×D1| or −|2×D2|.

As described above, when the subtractor 507 outputs a negative value, the signal output from the subtractor 507, that is, a difference between the low-frequency components of the digital audio signals D1 and D2 supplied from the sound collecting elements is associated with the level of the wind noise.

When the subtractor 507 outputs the negative signal, the envelope detector 508 outputs an envelope level (wind noise level) L1 corresponding to the signal output from the subtractor 507. On the other hand, when the subtractor 507 outputs a positive signal, the envelope detector 508 outputs a value 0 as an output signal L1.

An adder 509 adds the digital audio signal D3 and the digital audio signal D4 and outputs an addition signal D3+D4. A subtractor 510 subtracts the digital audio signal D4 from the digital audio signal D3 and outputs a difference signal D3−D4. An absolute value converter 511 converts the output addition signal D3+D4 output from the adder 509 into an absolute value |D3+D4| thereof and supplies the absolute value |D3+D4| to an LPF 513. An absolute value converter 512 converts the difference signal D3−D4 output from the subtractor 510 into an absolute value |D3−D4| thereof and supplies the absolute value |D3−D4| to an LPF 514 having a transmission characteristic similar to that of the LPF 513. In low-frequency regions of the input audio signals, a signal output from the LPF 513 is substantially equal to the signal |D3+D4| input to the LPF 513, and a signal output from the LPF 514 is substantially equal to the signal |D3−D4| input to the LPF 514.

A subtractor 515 subtracts the signal |D3−D4| output from the LPF 514 from the signal |D3+D4| output from the LPF 513. A signal output from the subtractor 515 substantially corresponds to |D3+D4|−|D3−D4|. An envelope detector 516 detects an envelope of the signal output from the subtractor 515 and outputs a wind noise level L1 of the detected envelope.

Among sounds collected using the sound collecting elements 301 to 304, a sound is not generated by wind but is generated by the subject, the signal output from the LPF 513 corresponds to |D3+D4|≈|2×D3|≈|2×D4|, and the signal output from the LPF 514 corresponds to |D3−D4|≈0. As a result, the signal output from the subtractor 515 corresponds to |2×D3| or |2×D4|.

On the other hand, in the case where the sound is generated by wind, the low-frequency components of the digital audio signals D1 to D4 are not associated with one another. Therefore, in this case, the signal |D3−D4| output from the LPF 514 is larger than the signal |D3+D4| output from the LPF 513.

Specifically, when components of the wind noise included in the digital audio signals D3 and D4 are 180 degrees different from each other, the signal output from the LPF 513 corresponds to |D3+D4|≈0 and the signal output from the LPF 514 corresponds to |D3−D4|≈|2×D3|≈|2×D4|.

Accordingly, in a case where the sound collecting elements 301 to 304 sense wind noise, the subtractor 515 outputs a negative signal. In particular, in a case where the components of the wind noise included in the digital audio signals D3 and D4 are 180 degrees different from each other, the signal output from the subtractor 515 corresponds to −|2×D3| or −|2×D4|.

As described above, when the subtractor 515 outputs a negative value, the signal output from the subtractor 515, that is, a difference between the low-frequency components of the digital audio signals D3 and D4 supplied from the sound collecting elements is associated with the level of the wind noise.

Similarly to the envelope detector 508, when the subtracter 515 outputs the negative signal, the envelope detector 516 outputs an envelope level (wind noise level) L2 corresponding to the signal output from the subtracter 515. On the other hand, when the subtracter 515 outputs a positive signal, the envelope detector 516 outputs a value 0 as an output signal L2.

A determination unit 517 calculates an average value L of the level L1 output from the envelope detector 508 and the level L2 output from the envelope detector 516, and outputs the average value L as an average value of all the digital audio signals. Note that one of the wind noise levels L1 and L2 which is higher may be output instead of the average value L which is the average value of the wind noise levels L1 and L2.

Figure 6:
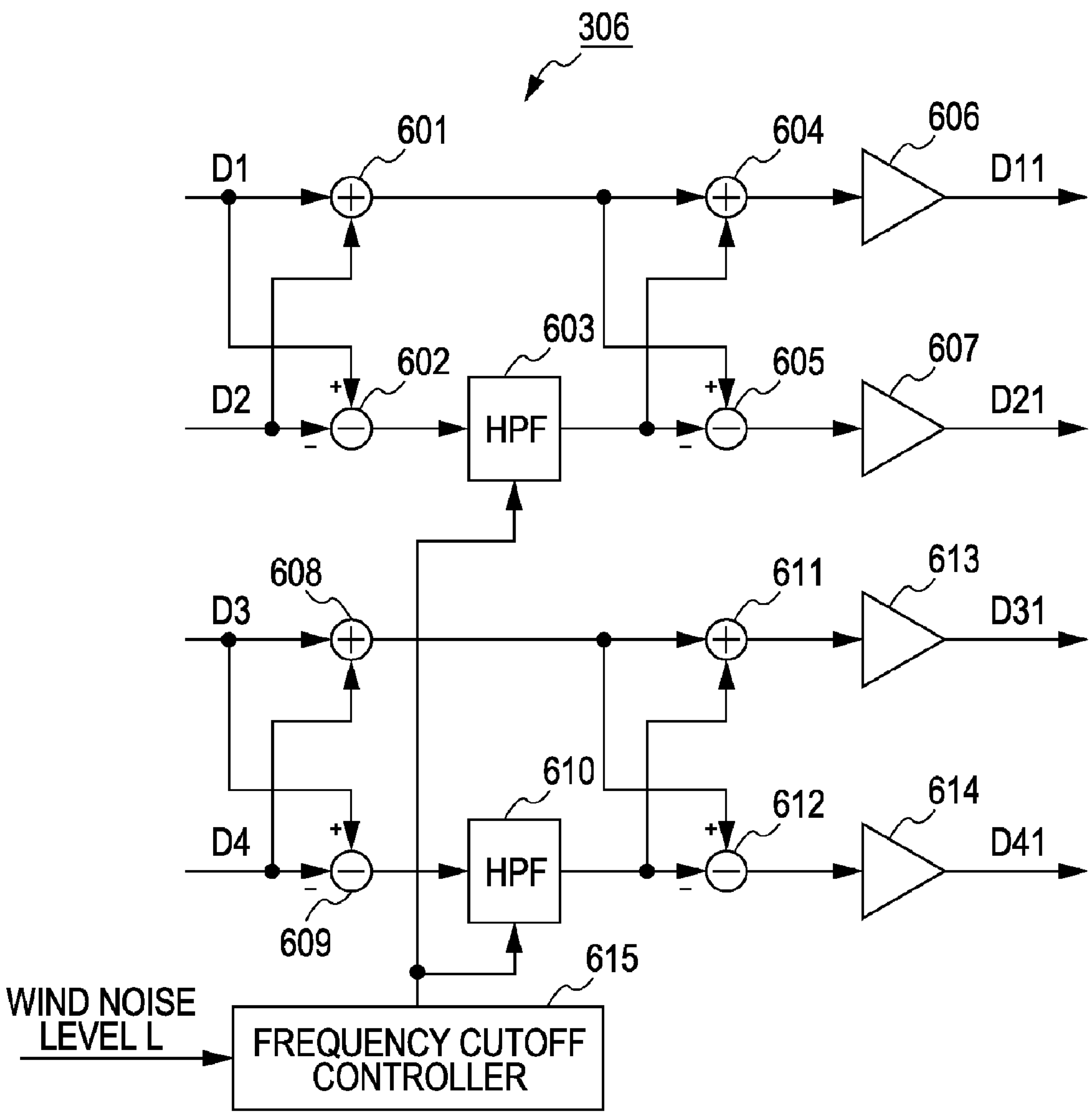
FIG. 6 is a block diagram illustrating a configuration of a wind noise reduction unit.

FIG. 6 is a block diagram illustrating a configuration of the wind noise reduction unit 306.

The wind noise reduction unit 306 includes two systems: a first system used to reduce wind noise of the digital audio signals D1 and D2; and a second system used to reduce wind noise of the digital audio signals D3 and D4. In the present embodiment, the wind noise reduction unit 306 reduces low-frequency components of difference signals D1−D2 and D3−D4 using these two systems whereby the wind noise is reduced. Note that larger the wind noise level L is, higher a low-frequency cutoff is.

In the present embodiment, the pair of the digital audio signals D1 and D2 and the pair of the digital audio signals D3 and D4 which are used for detecting the wind noise using the wind noise detector 309 shown in FIG. 5 are also used for reducing the wind noise. Since the pairs of the digital audio signals are the same as those used in the wind noise detector 309 shown in FIG. 5, variation of characteristics of the sound collecting elements may be suppressed.

An adder 601 adds the digital audio signal D1 and the digital audio signal D2 and outputs an additional signal D1+D2. A subtractor 602 subtracts the digital audio signal D2 from the digital audio signal D1 and outputs a difference signal D1−D2.

An HPF (high-pass filter) 603 is used to reduce low-frequency components of the difference signal D1−D2 and is a filter which allows high-pass components to pass. A frequency cutoff controller 615 changes cutoff frequencies of the HPF 603 and a HPF 610 in accordance with the wind noise level L and controls frequency characteristics of the HPFs 603 and 610.

Figure 7A:
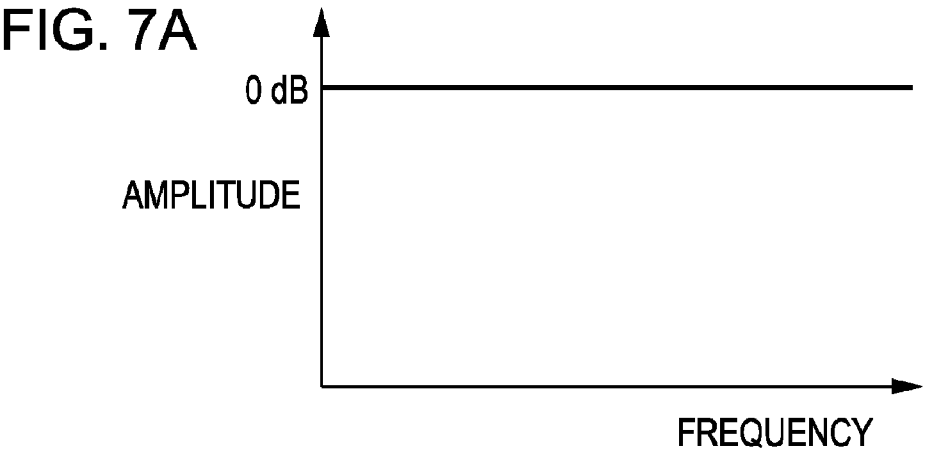
FIGS. 7A to 7C are graphs illustrating frequency characteristics of a high-pass filter included in the wind noise reduction unit.
Figure 7B:
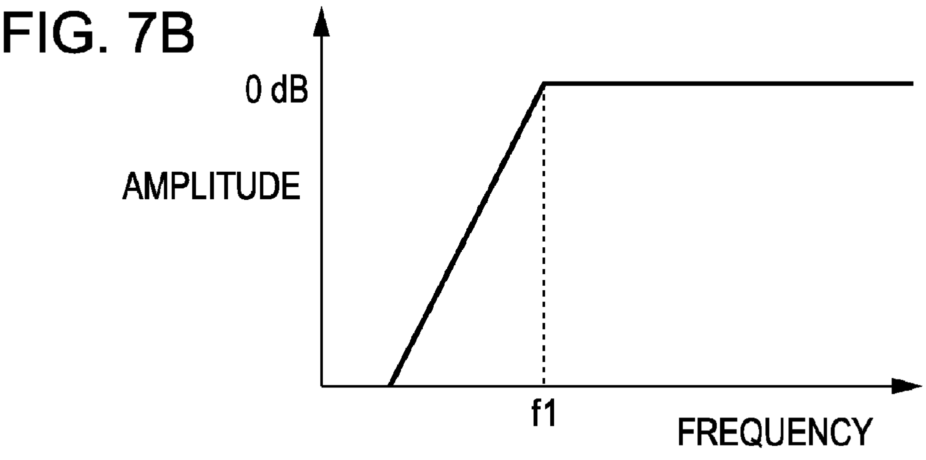
Figure 7C:
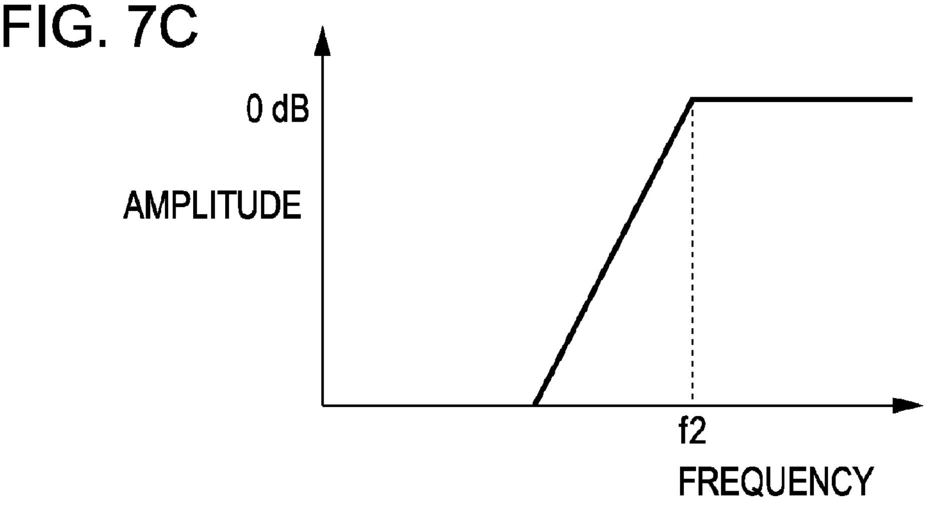

FIGS. 7A to 7C are graphs illustrating the frequency characteristics of the HPF 603. In FIGS. 7A to 7C, the axis of abscissa represents a frequency and the axis of ordinate represents an amplifier (or transmittance).

When the wind noise level L is smaller than a first threshold value, the frequency cutoff controller 615 controls the HPF 603 to output a signal without attenuation of a level of the signal at all frequency regions, that is, from a low-frequency region to a high-frequency region as shown in FIG. 7A.

When the wind noise level L is greater than or equal the first threshold value and is smaller than a second threshold value (the first threshold value<the second threshold value), the frequency cutoff controller 615 controls the HPF 603 to determine the cutoff frequency so that amplitude at a predetermined frequency f1 or lower attenuates as shown in FIG. 7B. When the wind noise level L is greater than or equal to the second threshold value, the frequency cutoff controller 615 determines the cutoff frequency of the HPF 603 is to be a frequency f2 (f1<f2) as shown in FIG. 7C.

As described above, since a small value is set as the cutoff frequency of the HPF 603 when the wind noise level L is small, low-frequency components of the audio data supplied from the sound collecting elements are obtained. On the other hand, since a large value is set as the cutoff frequency of the HPF 603 when the wind noise level L is large, amplitude in a frequency range mainly including wind noise attenuates. Accordingly, the wind noise is sufficiently reduced.

An adder 604 adds a signal output from the adder 601 to a signal output from the HPF 603. A signal output from the adder 604 substantially corresponds to 2D1(≈(D1+D2)+(D1−D2)) without taking influence of the HPF 603 into consideration. A subtractor 605 subtracts the signal output from the HPF 603 from the signal output from the adder 601. A signal output from the subtractor 605 substantially corresponds to 2D2(≈(D1+D2)−(D1−D2)) without taking influence of the HPF 603 into consideration.

As described above, wind noise components included in the digital audio signals D1 and D2 are not associated with each other. Therefore, a difference signal D1−D2 (or low-frequency components thereof) including the wind noise is larger than a difference signal D1−D2 of normal audio signals. Accordingly, the HPF 603 reduces the low-frequency components of the difference signal D1−D2 whereby the wind noise is reduced.

An amplifier 606 reduces an audio level of a signal output from the adder 604 to half thereof. An amplifier 607 reduces an audio level of a signal output from the subtractor 605 to half thereof. Accordingly, the amplifier 606 outputs an audio signal D11 in which the wind noise is reduced, and the amplifier 607 outputs an audio signal D21 in which the wind noise is reduced.

The second system used to reduce the wind noise of the digital audio signals D3 and D4 operates in the same way. That is, an adder 608 adds the digital audio signal D3 to the digital audio signal D4 and outputs an addition signal D3+D4. A subtractor 609 subtracts the digital audio signal D4 from the digital audio signal D3 and outputs a difference signal D3−D4.

The HPF 610 is used to reduce low-frequency components of the difference signal D3−D4 and is a filter which allows high-frequency components to pass. As with the HPF 603, a frequency characteristic of the HPF 610 is controlled using the frequency cutoff controller 615 in accordance with the wind noise level L.

An adder 611 adds a signal output from the adder 608 to a signal output from the HPF 610. A signal output from the adder 611 substantially corresponds to 2D3(≈(D3+D4)+(D3−D4)) without taking influence of the HPF 610 into consideration. A subtractor 612 subtracts the signal output from the HPF 610 from the signal output from the adder 608. A signal output from the subtractor 612 substantially corresponds to 2D4(≈(D3+D4)−(D3−D4)) without taking influence of the HPF 610 into consideration.

An amplifier 613 reduces an audio level of a signal output from the adder 611 to half thereof. An amplifier 614 reduces an audio level of a signal output from the subtractor 612 to half thereof. Accordingly, the amplifier 613 outputs an audio signal D31 in which the wind noise is reduced, and the amplifier 614 outputs an audio signal D4|in which the wind noise is reduced.

As described above, when the wind noise is not detected, that is, when the wind noise level L is a negligible level, the HPFs 603 and 610 output signals of all frequency regions, that is, from a low-frequency region to a high-frequency region without attenuation of the input signals. On the other hand, when the wind noise level L is high, high values are set as cutoff frequencies of the HPFs 603 and 610 so that comparatively high frequency components are reduced.

In the present embodiment, the frequency characteristics of the HPFs 603 and 610 are switched among the three characteristics shown in FIGS. 7A to 7C using the frequency cutoff controller 615. However, the present invention is not limited to this, and the frequency characteristics of the HPFs 603 and 610 may be continuously switched among the three characteristics.

Operation of the volume controller 310 will now be described.

The volume controller 310 includes a gain variable attenuator, and is used to control amplitude of the low-frequency channel signal LF in accordance with the wind noise level L supplied from the wind noise detection unit 309 and output the signal to the ALC 308.

Figure 4A:
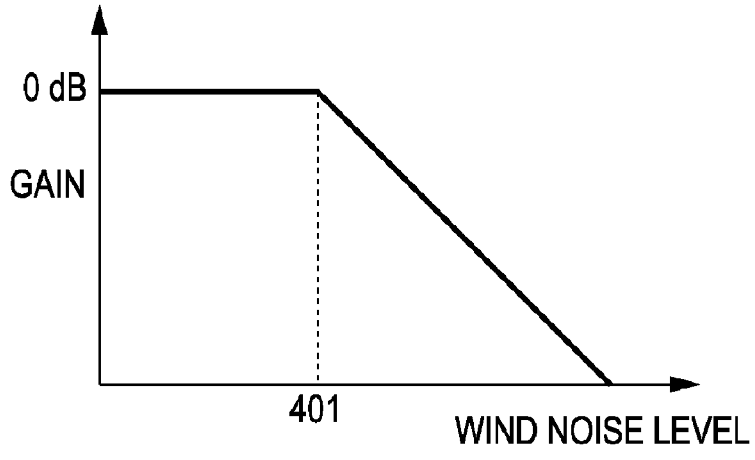
FIGS. 4A to 4C are graphs illustrating characteristics of a volume controller.
Figure 4B:
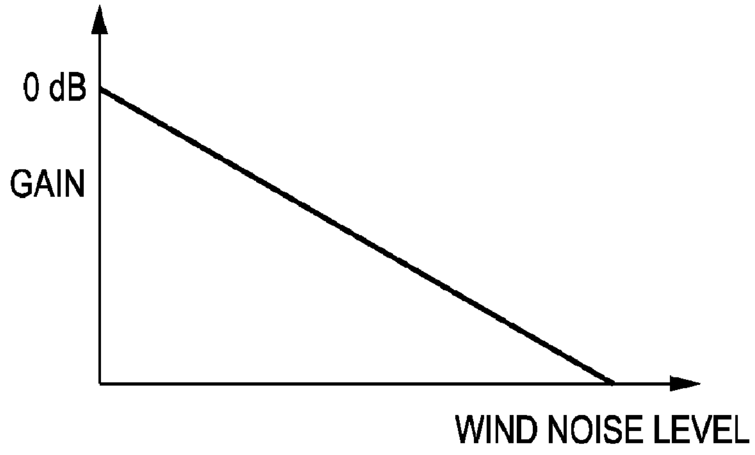
Figure 4C:
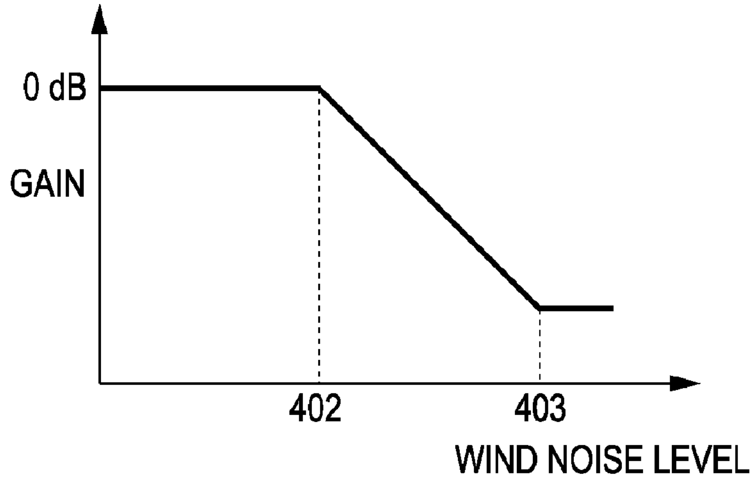

FIGS. 4A to 4C are graphs illustrating characteristics of the volume controller 310.

In FIGS. 4A to 4C, the axis of abscissa represents the wind noise level L, and the axis of ordinate represents a gain of the volume controller 310.

In FIG. 4A, when the wind noise level L is greater than or equal to a predetermined value 401, the higher the wind noise level L is, the larger attenuation of the low-frequency channel signal LF becomes. In FIG. 4B, the higher the wind noise level L is, the larger the attenuation of the low-frequency channel signal LF becomes. In FIG. 4C, when the wind noise level L is less than or equal to a first threshold value 402, the low-frequency channel signal LF is output without being changed. When the wind noise level L is higher than the first threshold value 402, the higher the wind noise level L is, the larger the attenuation of the low-frequency channel signal LF becomes. When the wind noise level L is higher then a second threshold value 403, which is higher than the first threshold value 402, the attenuation of the signal of the low-frequency channel signal LF becomes stable.

In the present embodiment, the volume controller 310 controls a level of the low-frequency channel signal LF in accordance with one of the characteristics shown in FIGS. 4A to 4C.

Since the level of the low-frequency channel signal LF is controlled in accordance with the wind noise level L, even when the low-frequency channel signal LF is amplified along with other channels using the ALC 308 arranged on the downstream side, the wind noise is not emphasized.

Note that in the present embodiment, the wind noise reduction unit 306 reduces the low-frequency components of the difference signal D1−D2 and the difference signal D3−D4.

However, the present invention is not limited to this and the wind noise reduction unit 306 may reduce the low-frequency components of a difference signal D1−D3 and a difference signal D1−D4.

A second embodiment of the present invention will now be described.

Figure 8:
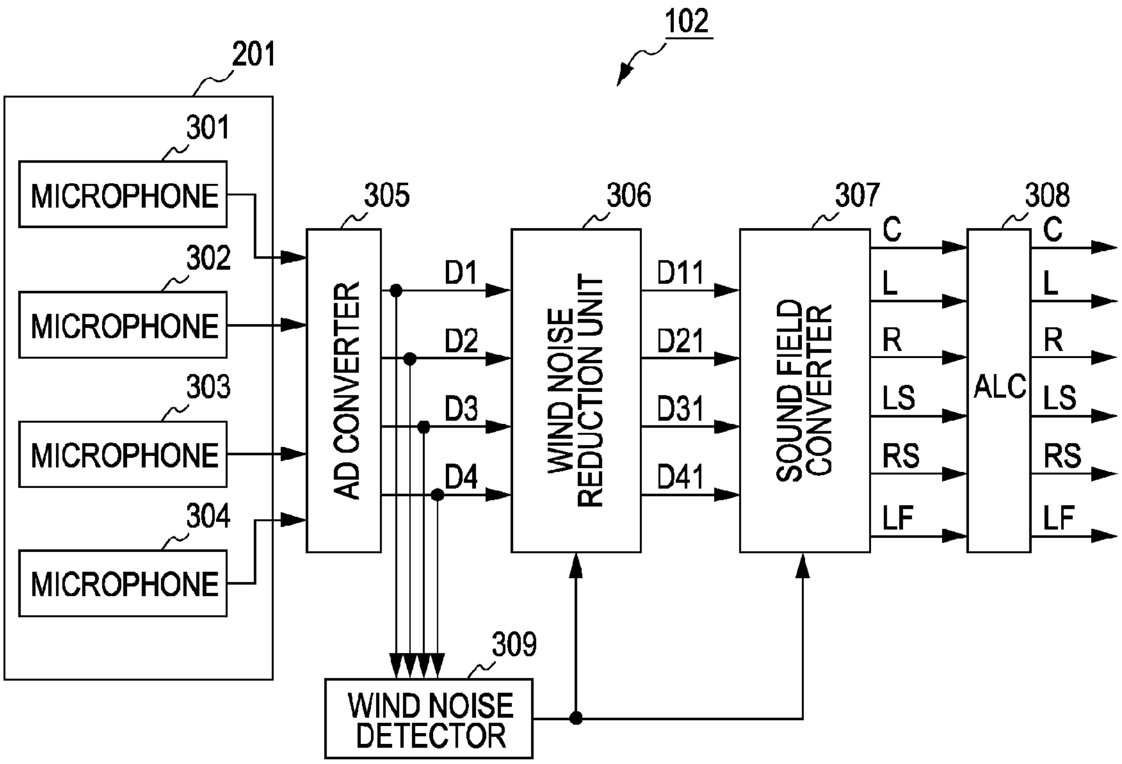
FIG. 8 is a block diagram illustrating another configuration of the audio input unit.

FIG. 8 is a block diagram illustrating a configuration of the audio input unit 102 according to the second embodiment. In FIG. 8, configurations and operations of a microphone unit 201, an AD converter 305, a wind noise reduction unit 306, a wind noise detector 309, and an ALC 308 are the same as those shown in FIG. 3. The present embodiment shown in FIG. 8 is different from the first embodiment shown in FIG. 3 in that a sound field converter 307 controls processing of generating a low-frequency channel LF in accordance with a wind noise level L supplied from the wind noise detection unit 309.

Portions of the configuration of the second embodiment which are different from those of the first embodiment shown in FIG. 3 will be described hereinafter.

Figure 9:
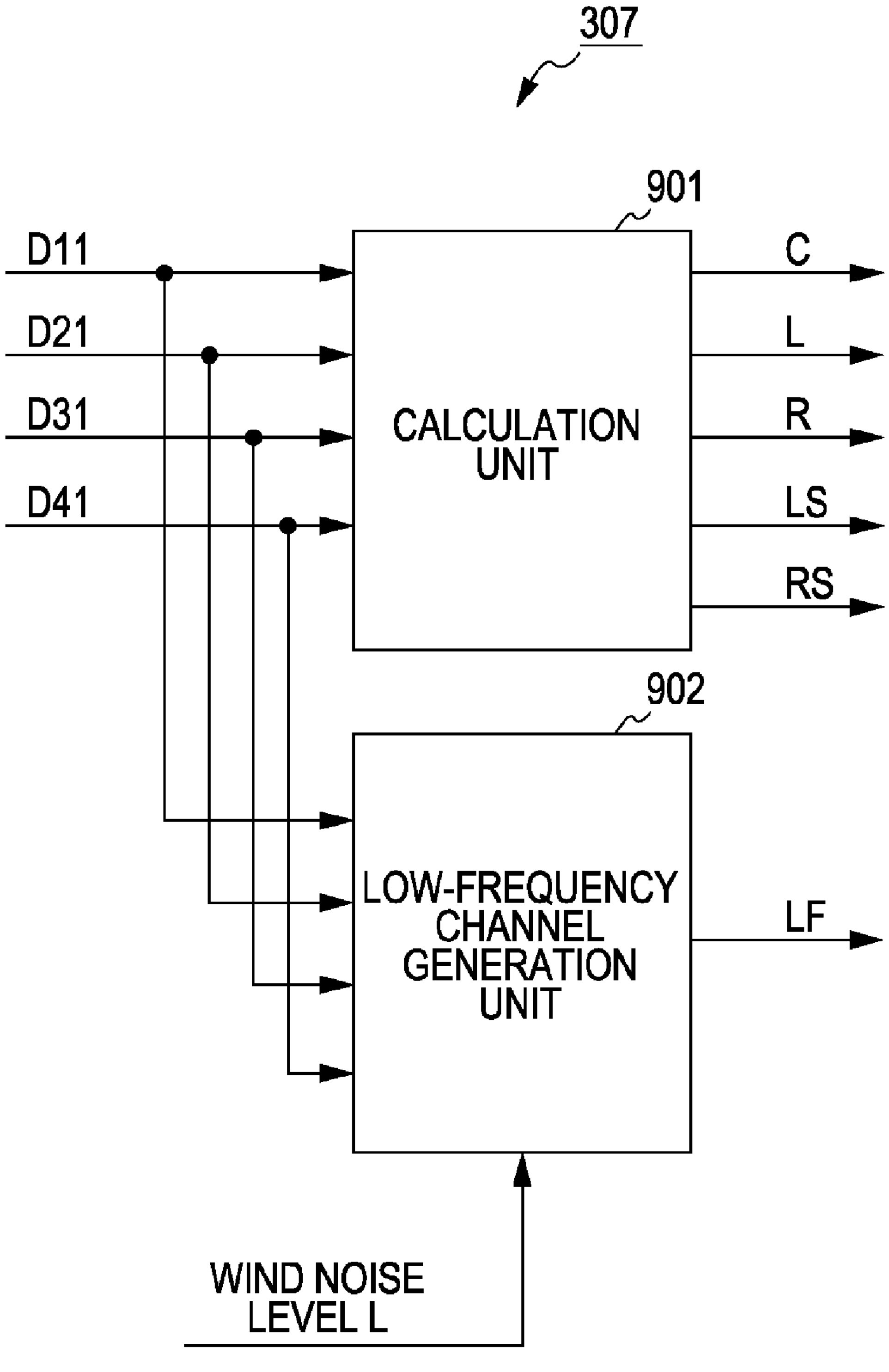
FIG. 9 is a block diagram illustrating a configuration of a sound field converter.

FIG. 9 is a block diagram illustrating a configuration of the sound field converter 307.

In FIG. 9, audio signals D11 to D41 output from the wind noise reduction unit 306 are supplied to a calculation unit 901 and a low-frequency channel generation unit 902. Furthermore, a signal of the wind noise level L output from the wind noise detection unit 309 is supplied to the low-frequency channel generation unit 902.

The calculation unit 901 generates pieces of audio data corresponding to channels C, L, R, LS, and RS which have different directional characteristics by performing known calculation processing on the input audio signals D11 to D41.

The low-frequency channel generation unit 902 extracts pieces of audio data, each of which corresponds to a predetermined frequency range, from the digital audio signals D11 to D41 and generates audio data of a low-frequency channel LF.

Figure 10:
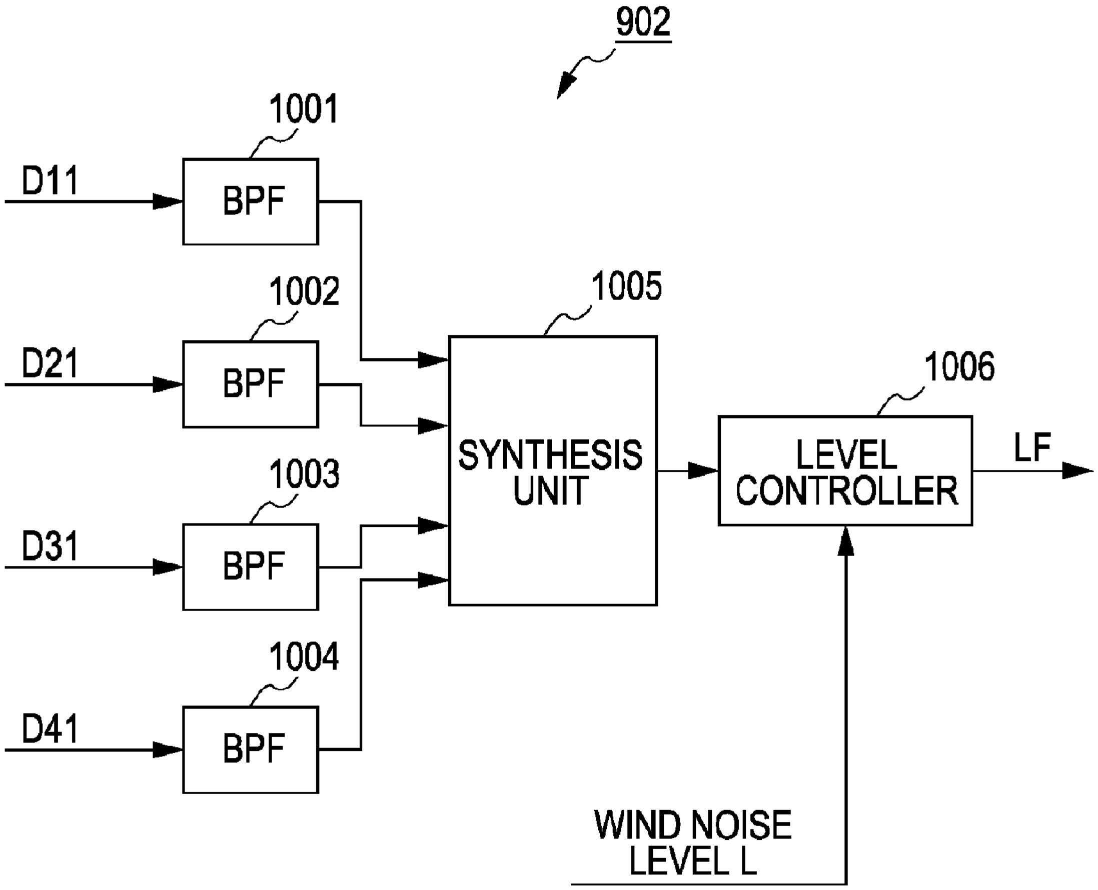
FIG. 10 is a block diagram illustrating a configuration of a low-frequency channel generation unit.

FIG. 10 is a block diagram illustrating a configuration of the low-frequency channel generation unit 902.

In FIG. 10, the input digital audio signals D11 to D41 are supplied to bandpass filters (BPFs) 1001 to 1004, respectively. Each of the BPFs 1001 to 1004 extracts components in a predetermined frequency range of a corresponding one of the input audio signals D11 to D41, for example, in a range from 100 kHz to 200 kHz inclusive, and outputs the components to a synthesis unit 1005. The synthesis unit 1005 synthesizes signals supplied from the BPFs 1001 to 1004 and outputs a synthesized signal to a level controller 1006.

The level controller 1006 controls a level of audio data of the low-frequency channel output from the synthesis unit 1005 in accordance with the input wind noise level L supplied from the wind noise detection unit 309.

Specifically, the level controller 1006 controls the level of the signal output from the synthesis unit 1005 in accordance with the input wind noise level L as shown in FIGS. 4A to 4C, and outputs the signal as a low-frequency channel signal LF.

As described above, in the present embodiment, the sound field converter 307 is used to control the level of the low-frequency channel signal LF in accordance with the wind noise level L.

Accordingly, even when the ALC 308, which is arranged on the downstream side, amplifies the low-frequency channel signal LF along with the other channel signals, wind noise is not emphasized.

Note that in the embodiments described above, configurations in which audio signals output from four sound collecting elements are converted into 5.1 channel audio data are described.

However, the present invention is applicable to a configuration in which the audio signals are converted into, instead of the 5.1 channel audio data, more than 5.1 channel audio data. Furthermore, the number of sound collecting elements is not limited to four and any other number may be employed.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-051818 filed Mar. 1, 2007 and No. 2008-025832 filed Feb. 6, 2008, which are hereby incorporated by reference herein in their entirety.

What is claimed is:

1. A signal processing apparatus comprising:

a plurality of sound collecting elements;

a noise detector configured to detect a level of noise included in a low-frequency band of a plurality of audio signals output from the plurality of sound collecting elements;

a noise reduction unit configured to reduce the noise included in the plurality of audio signals output from the plurality of sound collecting elements in accordance with a signal output from the noise detector;

a converter configured to convert the plurality of audio signals output from the noise reduction unit into pieces of audio data corresponding to a plurality of channels including a low-frequency channel and other channels;

a low-frequency channel controller configured to control a level of the audio data corresponding to the low-frequency channel in accordance with the level of the noise detected using the noise detector; and a level controller configured to control the level of the audio data of the low-frequency channel output from the low-frequency channel controller and levels of the pieces of audio data corresponding to the other channels output from the converter.

2. An apparatus according to claim 1, wherein the low-frequency channel controller controls attenuation of the audio data of the low-frequency channel so that the higher the level of the noise is, the larger the attenuation of the audio data of the low-frequency channel becomes.

3. An apparatus according to claim 1, wherein the noise reduction unit includes a high-pass filter to which a difference between two audio signals among the plurality of audio signals output from the plurality of sound collecting elements is supplied and a frequency cutoff controller operating so that the higher the level of the noise detected using the noise detector is, the higher a cutoff frequency of the high-pass filter is set.

4. An apparatus according to claim 1, wherein the converter converts the plurality of audio signals output from the noise reduction unit into pieces of audio data corresponding to a plurality of channels having different directional characteristics and outputs the pieces of audio data corresponding to the plurality of channels having different directional characteristics as the pieces of audio data corresponding to the other channels, and generates the audio data corresponding to the low-frequency channel by extracting low-frequency components in the plurality of audio signals output from the noise reduction unit, and by synthesizing the audio signals corresponding to extracted low-frequency components.

5. An apparatus according to claim 1, wherein the noise detector detects the level of the noise using a difference between audio signals output from two sound collecting elements among the plurality of sound collecting elements.

6. An apparatus according to claim 1, wherein the level controller commonly controls the level of the audio data corresponding to the low-frequency channel and the levels of the pieces of audio data corresponding to the other channels in accordance with one of the levels.

7. A signal processing apparatus comprising:

a plurality of sound collecting elements;

a noise detector configured to detect a level of noise included in a low-frequency band of a plurality of audio signals output from the plurality of sound collecting elements;

a noise reduction unit configured to reduce the noise included in the plurality of audio signals output from the plurality of sound collecting elements in accordance with a signal output from the noise detector;

a converter configured to convert the plurality of audio signals output from the noise reduction unit into pieces of audio data corresponding to a plurality of channels having different directional characteristics and into audio data corresponding to a low-frequency channel, wherein the converter includes a calculation unit configured to generate the pieces of audio data corresponding to the plurality of channels having different directional characteristics by calculating the plurality of audio signals output from the noise reduction unit, a synthesis unit configured to extract and synthesize low-frequency components included in the plurality of audio signals output from the noise reduction unit, and a low-frequency channel controller configured to control a level of a signal output from the synthesis unit in accordance with the level of the noise detected using the noise detector and to output the signal as the audio data corresponding to the low-frequency channel; and a level controller configured to control the level of the audio data of the low-frequency channel and levels of the pieces of audio data corresponding to the other channels output from the converter.

8. An apparatus according to claim 7, wherein the low-frequency channel controller controls attenuation of the audio data of the low-frequency channel so that the higher the level of the noise is, the larger the attenuation of the audio data of the low-frequency channel becomes.

9. An apparatus according to claim 7, wherein the noise reduction unit includes a high-pass filter to which a difference between two audio signals among the plurality of audio signals output from the plurality of sound collecting elements is supplied and a frequency cutoff controller operating so that the higher the level of the noise detected using the noise detector is, the higher a cutoff frequency of the high-pass filter is set.

10. An apparatus according to claim 7, wherein the noise detector detects the level of the noise using a difference between audio signals output from two sound collecting elements among the plurality of sound collecting elements.

11. An apparatus according to claim 7, wherein the level controller commonly controls the level of the audio data corresponding to the low-frequency channel and the levels of the pieces of audio data corresponding to the other channels in accordance with one of the levels.

12. An apparatus according to claim 7, wherein the plurality of sound collecting elements are omnidirectional sound collecting elements.

* * * * *